United States Patent
Tang et al.

(10) Patent No.: US 7,525,872 B2
(45) Date of Patent: Apr. 28, 2009

(54) METHOD AND APPARATUS FOR CEMENT BOND EVALUATION USING TRANSVERSELY POLARIZED SHEAR WAVES

(75) Inventors: Xiao-Ming Tang, Sugar Land, TX (US); Alexei Bolshakov, Pearland, TX (US); Tsili Wang, Katy, TX (US); Douglas Patterson, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/787,628

(22) Filed: Feb. 26, 2004

(65) Prior Publication Data

US 2005/0190648 A1 Sep. 1, 2005

(51) Int. Cl.
*G01V 1/44* (2006.01)
*G01V 1/50* (2006.01)

(52) U.S. Cl. .............................. 367/35; 367/30; 367/31; 181/105

(58) Field of Classification Search .................... 367/25, 367/26, 35, 28, 30, 31; 181/105; 702/6
See application file for complete search history.

(56) References Cited

U.S. PATENT DOCUMENTS

| | | | |
|---|---|---|---|
| 2,660,249 A | 11/1953 | Jakosky | |
| 3,061,037 A * | 10/1962 | Evans | 367/25 |
| 3,221,548 A | 12/1965 | Wilson | |
| 3,354,983 A * | 11/1967 | Erickson et al. | 367/140 |
| 3,512,407 A | 5/1970 | Zill | |
| 3,724,589 A | 4/1973 | Chapman | |
| 3,732,947 A * | 5/1973 | Moran et al. | 367/35 |
| 4,255,798 A * | 3/1981 | Havira | 367/35 |
| 4,434,663 A | 3/1984 | Peterson | |
| 4,703,427 A | 10/1987 | Catala | |
| 4,802,145 A * | 1/1989 | Mount, II | 367/35 |
| 4,805,156 A | 2/1989 | Attali | |
| 4,834,209 A * | 5/1989 | Vogel et al. | 181/105 |
| 4,885,723 A * | 12/1989 | Havira et al. | 367/35 |
| 4,896,303 A | 1/1990 | Leslie | |
| 4,928,269 A | 5/1990 | Kimball | |
| 5,036,496 A | 7/1991 | Rutledge | |
| 5,081,391 A * | 1/1992 | Owen | 310/334 |
| 5,089,989 A | 2/1992 | Schmidt | |
| 5,109,698 A * | 5/1992 | Owen | 73/632 |
| 5,154,081 A * | 10/1992 | Thompson et al. | 73/597 |
| 5,216,638 A | 6/1993 | Wright | |

(Continued)

OTHER PUBLICATIONS

Gauthier, et al. "EMAT Generation of Polarized Shear Waves for Pipe Inspection." PACNDT 1998—Proceedings, NDTnet, Apr. 1999, vol. 4, No. 4.*

(Continued)

*Primary Examiner*—Jack W. Keith
*Assistant Examiner*—Scott A Hughes
(74) *Attorney, Agent, or Firm*—Bracewell & Giuliani LLP

(57) ABSTRACT

A method and apparatus useful to determine the integrity of a cement bond log disposed in the annular space between a casing and a wellbore. The method and apparatus produce a transversely polarized shear wave and emit the wave through the casing and into the wellbore. The transversely polarized shear wave attenuates upon passage through the cement bond log. The integrity of the cement bond log can be determined through an analysis and evaluation of the attenuation results.

19 Claims, 7 Drawing Sheets

U.S. PATENT DOCUMENTS

| | | | |
|---|---|---|---|
| 5,377,160 A * | 12/1994 | Tello et al. | 367/35 |
| 5,763,773 A | 6/1998 | Birchak | |
| 5,804,727 A * | 9/1998 | Lu et al. | 73/597 |
| 6,018,496 A * | 1/2000 | Stanke et al. | 367/35 |
| 6,041,861 A | 3/2000 | Mandal | |
| 6,081,116 A | 6/2000 | Wu | |
| 6,176,132 B1 | 1/2001 | MacLauchlan | |
| 6,390,196 B1 * | 5/2002 | Montaron et al. | 166/290 |
| 6,568,271 B2 * | 5/2003 | Shah et al. | 73/599 |
| 2003/0043055 A1 | 3/2003 | Schultz | |
| 2004/0117119 A1 | 6/2004 | West | |
| 2004/0221652 A1 * | 11/2004 | Flora et al. | 73/578 |

OTHER PUBLICATIONS

Yew, Ching H. "Using ultrasonic SH waves to estimate the quality of adhesive bonds: A preliminary study." J. Acoust. Soc. Am. 76 (2) Aug. 1984.*

Office Action mailed Mar. 17, 2006 from U.S. Appl. No. 10/802,612.

* cited by examiner

METHOD AND APPARATUS FOR CEMENT BOND EVALUATION USING TRANSVERSELY POLARIZED SHEAR WAVES

BACKGROUND OF THE INVENTION

1. Field of the Invention

The invention relates generally to the field of production of hydrocarbons from wellbores. More specifically, the present invention relates to a method and apparatus to evaluate the integrity of bonds that adhere wellbore casing to a wellbore. Yet more specifically, the present invention relates to a method and apparatus capable of evaluating bond integrity of bonding cements of different densities. Yet even more specifically, the present invention relates to a method and apparatus capable of evaluating cement bond integrity that can distinguish a casing bonded with a light weight cement from a casing surrounded with a micro-annulus fluid.

2. Description of Related Art

Hydrocarbon producing wellbores comprise casing 8 set within the wellbore 5, where the casing 8 is bonded to the wellbore by adding cement 9 within the annulus formed between the outer diameter of the casing 8 and the inner diameter of the wellbore 5. The cement bond not only adheres the casing 8 within the wellbore 5, but also serves to isolate adjacent zones (Z1 and Z2) within the formation 18 from one another. Isolating adjacent zones can be important when one of the zones contains oil or gas and the other zone includes a non-hydrocarbon fluid such as water. Should the cement 9 surrounding the casing 8 be defective and fail to provide isolation of the adjacent zones, water or other undesirable fluid can migrate into the hydrocarbon producing zone thus diluting or contaminating the hydrocarbons within the producing zone.

To detect possible defective cement bonds, downhole tools 14 have been developed for analyzing the integrity of the cement 9 bonding the casing 8 to the wellbore 5. These downhole tools 14 typically include transducers 16 disposed on their outer surface capable of emitting acoustic waves into the casing 8 and recording the attenuation of the acoustic waves as they travel, or propagate, across the surface of the casing 8. By analyzing the attenuation of the acoustic wave, the efficacy and integrity of the cement bond can be evaluated.

The amount of attenuation however can depend on how the acoustic wave is polarized and coupling condition between the casing 8 and the cement 9 bonding the casing 8 to the wellbore 5. Typical downhole tools 14 having acoustic wave transducers 16 generate acoustic waves that are polarized perpendicular to the surface of the casing 8. Such waves are referred to as compression/shear or P-SV waves since the particle motion direction of either compressional (P) or shear (S) component of the acoustic wave is in a vertical (V) plane perpendicular to the casing 8. The attenuation of the acoustic wave as it propagates along the surface of the casing 8 varies in response to the condition of the cement bond and also in response to the type of cement 9 disposed between the casing 8 and the formation 18. More specifically, as the acoustic wave propagates along the length of the casing 8, the wave loses, or leaks, energy into the formation 18 through the cement bond—it is this energy loss that produces the attenuation of the acoustic wave. Conversely, when the casing 8 is not bonded, a condition also referred to as "free pipe," the micro-annulus fluid behind the casing does not provide for any shear coupling between the casing 8 and the formation 18. Loss of shear coupling significantly reduces the compressional coupling between the casing 8 and the formation 18. This result occurs since fluid has no shear modulus as well as a much lower bulk modulus in relation to cement. Because of these physical characteristics of fluid, the entire SV component of the P-SV wave and a large portion of the P component of the P-SV wave do not propagate outside of the casing 8 and thus experience a much reduced attenuation.

Reduced attenuation of an acoustic wave is not limited to situations where the casing 8 is surrounded by fluid, but the presence of some cements can also significantly reduce acoustic wave attenuation. For example, light weight cement (LWC), or cement having a density less than approximately 12 lbs/gal can reduce acoustic wave attenuation. Light weight cement has a shear modulus, thus light weight cement can maintain shear coupling between the casing 8 and the formation 18. However, the density of light weight cement is not substantially greater than the density of many fluids (such as water), thus the attenuation of some acoustic waves, especially P-SV waves, is diminished when encountering casing 8 surrounded by a light weight cement. The result of this reduced attenuation is a decreased ability to detect the difference between fluid and light weight cement as well as a diminished capacity to detect poor cement bonds in light weight cement.

Therefore, there exists a need for a device and method to conduct cement bond logs within a casing, where the device and method is capable of differentiating between fluid that surrounds a casing and light weight cement bonding a casing.

BRIEF SUMMARY OF THE INVENTION

The present invention includes a method of evaluating a casing bond disposed between a casing and a wellbore comprising, inducing a transversely polarized shear wave into the casing, monitoring the transversely polarized shear wave, and estimating a characteristic of the casing bond disposed between the casing and the wellbore based on the evaluation of the transversely polarized shear wave. The frequency of the transversely polarized shear wave can range from about 60 kHz to about 120 kHz or can be about 80 kHz. The wavelength of the transversely polarized shear wave of the present method can range from at least 4 times the thickness of the casing to at least 10 times the thickness of the casing.

The method of the present invention further comprises identifying the type of casing bond disposed between the casing and the wellbore. The type of casing bond identified with the present invention can be regular cement, light weight cement, and free pipe.

Alternatively, the present invention can include a method of evaluating a casing bond disposed between a casing and a wellbore comprising, inserting a tool within the casing, wherein the tool is capable of inducing a transversely polarized shear wave in the casing. The alternative method further includes monitoring the transversely polarized shear wave passing through the casing bond, and estimating a characteristic of the casing bond disposed between the casing and the wellbore based on the evaluation of the transversely polarized shear wave.

The downhole tool of the alternative method can include at least one transducer capable of creating the transversely polarized shear wave and at least one receiver capable of receiving the transversely polarized shear wave. Optionally, the at least one transducer capable of creating the transversely polarized shear wave can comprise at least two disks.

The alternative method of the present invention can further include orienting the at least two disks such that the propagation of waves produced by each of the at least two disks are emitted substantially perpendicular to one another. The frequency of the transversely polarized shear waves produced in the alternative method can range from about 60 kHz to about 120 kHz or can be about 80 kHz. The wavelength of these waves can be from at least 4 times the thickness of the casing to at least 10 times the thickness of the casing.

The alternative method of the present invention can further comprise identifying the type of casing bond disposed between the casing and the wellbore. Wherein the type of casing bond is selected from the group consisting of regular cement, light weight cement, regular cement having micro-annuluses therein, and free pipe.

The present invention includes an apparatus capable of evaluating a casing bond disposed between a casing and a wellbore comprising, a housing formed to be insertably retrievable from within the casing, a transmitting transducer capable of creating and transmitting a transversely polarized shear wave, wherein the transversely polarized shear wave can be attenuated upon passing through the casing bond, and a receiving transducer capable of receiving the attenuated transversely polarized shear wave. The apparatus of the present invention can further comprise a recorder in operative communication with the receiving transducer, where the recorder is capable of recording the attenuation of the transversely polarized shear wave passing through the casing bond.

The frequency of the transversely polarized shear wave produced by the transmitting transducer can range from about 60 kHz to about 120 kHz or can be about 80 kHz. Further, the wavelength of said the polarized shear wave produced by the transmitting transducer of the present invention can range from at least 4 times the thickness of the casing to at least 10 times the thickness of the casing. The response of the transversely polarized shear wave within the casing bond produced by the present invention can be dependent upon the type of casing bond disposed between the casing and the wellbore. The type of casing bond is selected from the group consisting of regular cement, light weight cement, and free pipe. The transmitting transducer of the present invention comprises at least two disks, preferably where the at least two disks are oriented such that the propagation of waves produced by each of the at least two disks are emitted substantially perpendicular to one another.

Accordingly, one of the advantages provided by the present invention is the ability to conduct cement bond logs within a casing while producing accurate bond log results capable of distinguishing between fluid and light weight cement surrounding the casing. The present invention is also capable of providing improved resolution of cement bond logs in regular cement as compared to convention methods using P-wave attenuation.

DETAILED DESCRIPTION OF THE INVENTION

The present invention includes a method and apparatus useful in determining characteristics of a casing bond disposed between a casing and a wellbore. The characteristics of the casing bond include the quality of the casing bond, the integrity of the cement that comprises the bond, the type of cement, and the thickness of the casing bond. The method generally involves inducing an acoustic wave in the casing proximate to the location where the casing bond is to be evaluated. The acoustic wave propagating within the casing can then be monitored to estimate characteristics of the casing bond. It is believed it is well within the scope of those skilled in the art to ascertain casing bond characteristics based on the monitoring of the induced acoustic wave, furthermore, this can be accomplished without undue experimentation.

One embodiment of the acoustic wave of the present invention is comprised of a shear wave polarized parallel to the surface of the material it is propagated in, where the wave is also transverse to the direction of propagation of the wave. As will be discussed in more detail below, a transmitting transducer attachable to a tool, such as a downhole tool, can generate the acoustic wave of the present invention. Also a receiving transducer can be included to monitor the response acoustic wave within the casing and forward the monitored data to an analyzer. The analyzer (not shown) can be included with the present invention capable of receiving the data from the receiving transducer and processing the data in order to estimate the casing bond characteristics.

Figure 1:
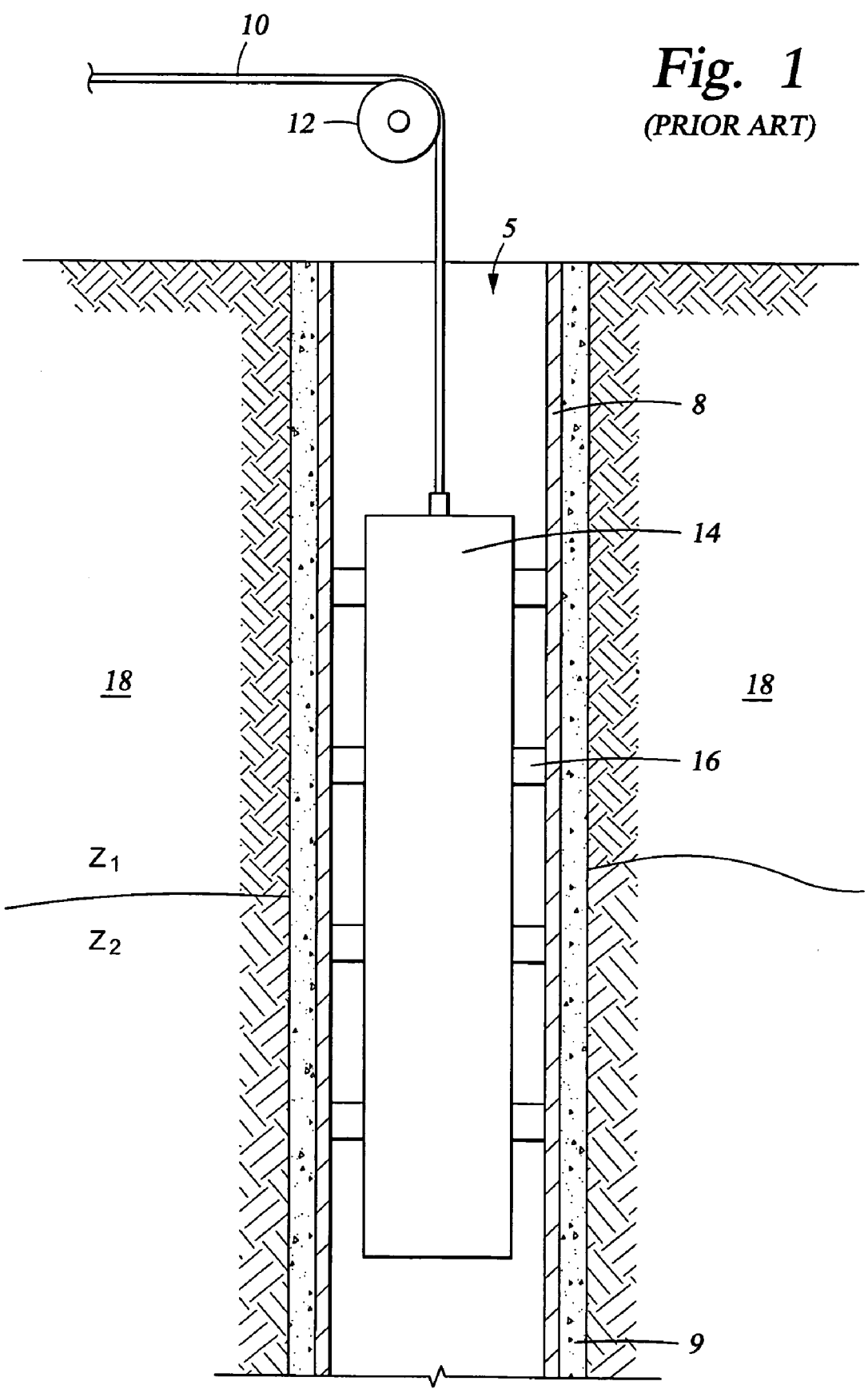
FIG. 1 depicts a partial cross section of prior art downhole cement bond log tool disposed within a wellbore.
Figure 2:
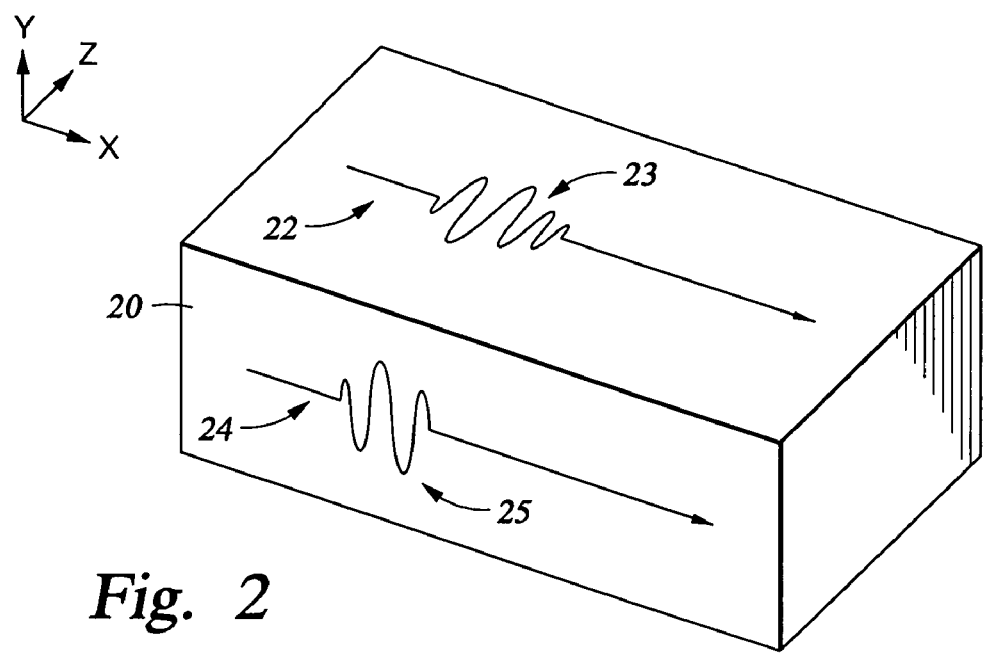
FIG. 2 illustrates a compressional/shear (P-SV) waveform along with a transversely polarized shear wave (TPSW) waveform propagating through a section of wave medium.

With reference now to FIG. 2, a medium 20 is illustrated having shown thereon the waveform of a horizontal wave 22 and a vertical wave 24. The medium 20 can be any solid material having elastic properties, for the purposes of the present invention the medium 20 can be a segmented cross section of a downhole casing. The arrow at the end of the horizontal wave 22 and the vertical wave 24 denotes the direction or propagation of the wave. Where the middle portion (23 and 25) of each of these waves depicts particle movement within the medium 20 caused by propagation of the respective waves through the medium 20. As is reflective of the name of the wave, the particle movement caused by the horizontal wave 22 is mostly in the horizontal direction (the z-plane). Likewise, the particle movement caused by the vertical wave 24 is primarily in the vertical direction (the y-plane). This distinction is pointed out because the vertical wave 24 is the compression wave form currently in use for cement bond log evaluations, whereas the horizontal wave 22 is the wave form considered for use with the present invention. The horizontal wave 22 of FIG. 2 is one example of an acoustic wave polarized parallel to the surface of the medium within which it travels and is transverse to the direction of its propagation—the horizontal wave 22 can also be referred to as a transversely polarized shear wave (TPSW).

Tests have been conducted to evaluate the response of compression/shear waves and transversely polarized shear waves propagated along a bonded casing. The bonds evaluated included regular cement, light weight cement, and free pipe (no cement). Free pipe was included in the analysis to represent situations where the casing was poorly bonded or where the casing was surrounded by a fluid. The tests performed included modeling the attenuation of the waves in two and three dimensional situations as well as test models. A description of the tests and the test results are provided in the examples below.

EXAMPLE 1

Figure 3:
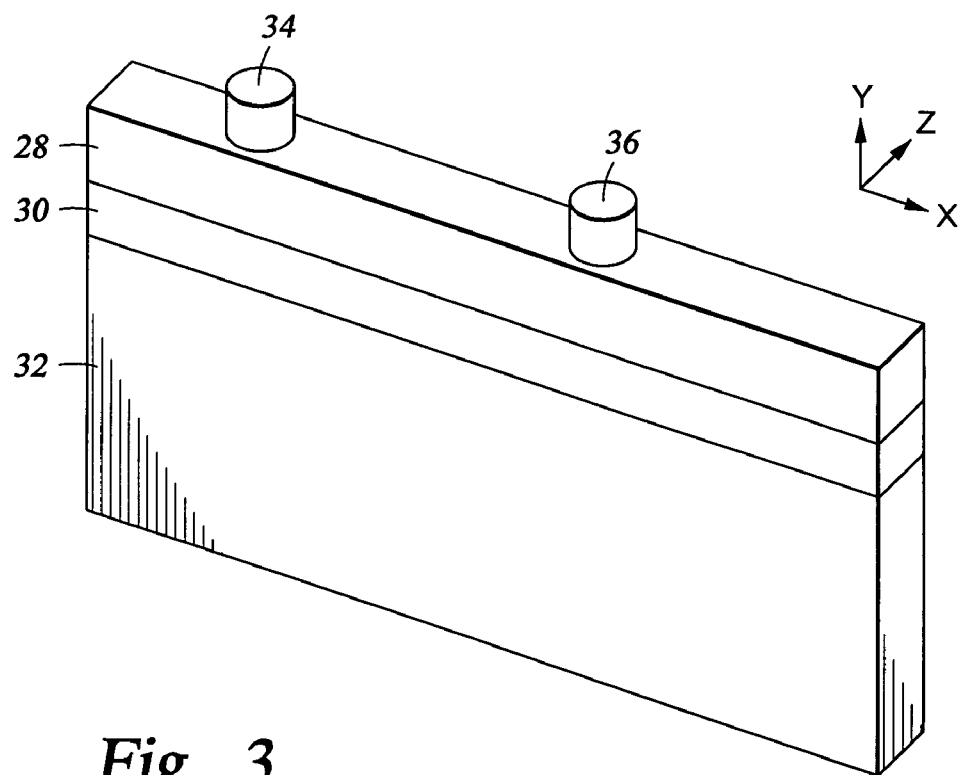
FIG. 3 depicts a perspective view of a modeled section of casing, cement bond, and wellbore formation.

With reference now to FIG. 3, the test of this example involved a two-dimensional model with a transmitting transducer 34 located at the origin (x=y=0) of the model. The two-dimensional model included a casing 28 extending in the x-direction, a layer 30 that can be either a casing bond (regular cement, light weight cement, or a fluid material). Table 1 contains the elastic/acoustic parameters of the model and the model dimensions.

A formation 32 is included with this model that extends into the x- and y-direction. The source was defined to generate a compression/shear wave (P-SV wave) as well as a transversely polarized shear wave. The model further included a receiver array of 5 receiving transducers 36 with a 5 cm inter-receiver spacing placed at 20 cm from the wave source. Optionally, the receiving transducers 36 can range from about 15 cm to about 60 cm from the transmitting transducer 34. With regard to the compression/shear wave, the receivers are assumed to sense the vertical displacement of the particles. Similarly, when modeling the transversely polarized shear wave, the receivers are assumed to sense the horizontal displacement transverse to the x-y plane.

TABLE I

Elastic/acoustic parameters

|  | P-SV velocity (m/s) | TPSW velocity (m/s) | Density (g/cc) | Thickness (cm) |
| --- | --- | --- | --- | --- |
| Casing | 5992 | 3202 | 7.5 | 1 |
| Regular Cement | 3250 | 1688 | 1.965 | 1.5 |
| LWC | 2357 | 1443.4 | 1 | 1.5 |
| Fluid | 1500 | — | 1 | 1.5 |
| Formation | 4000 | 2300 | 2.5 | ∞ |

The intent of the two-dimensional modeling was to study the wave attenuation change caused by the cement bond condition variation. The model does not fully simulate the entire performance and characteristics of a downhole acoustic tool, such as a segment bonded tool, i.e. a finite source within a housing coupling with a curved casing. However, the model is sufficient to model the response of an acoustic wave as it encounters a cement bond. The source wavelet is a Ricker wavelet with an 80 kHz center frequency where the waveforms consisting of a casing compressional wave as the first arrival and the large amplitude Rayleigh waves as the later arrival. The focus of the analysis of this model was on the first arrival waves since downhole tools typical only measure these waves and not the later arriving waves. It is believed that similar results can be attained with waves having a frequency of from about 60 kHz to about 120 kHz.

Figure 4A:
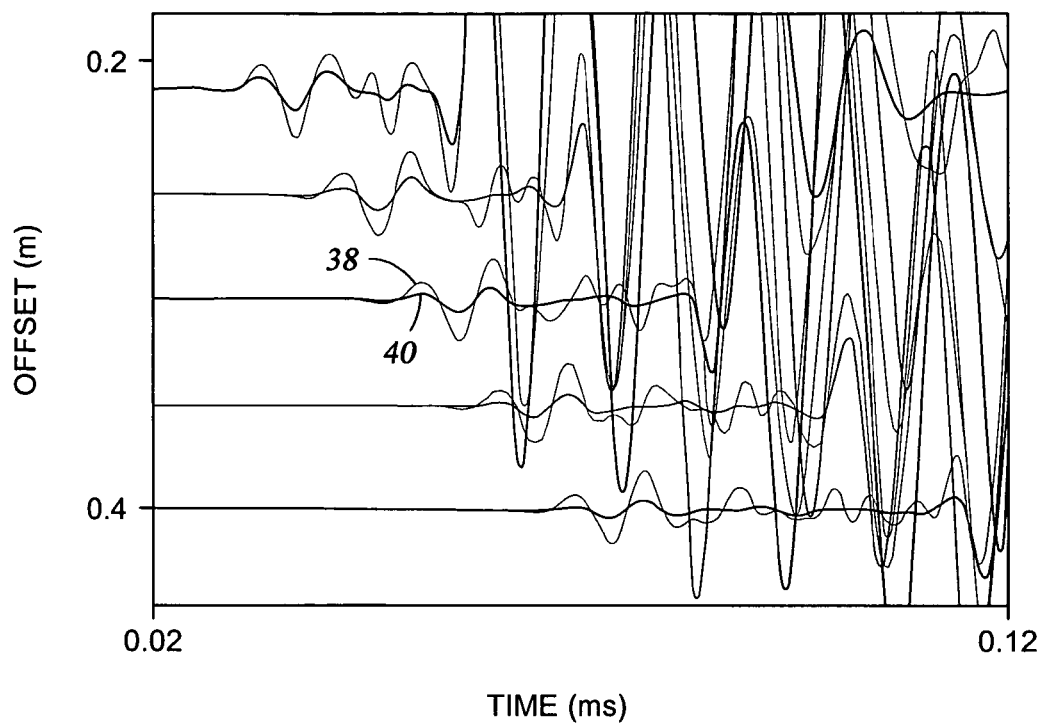
FIGS. 4a and 4b contain modeled wave attenuation results for a P-SV wave.
Figure 4B:
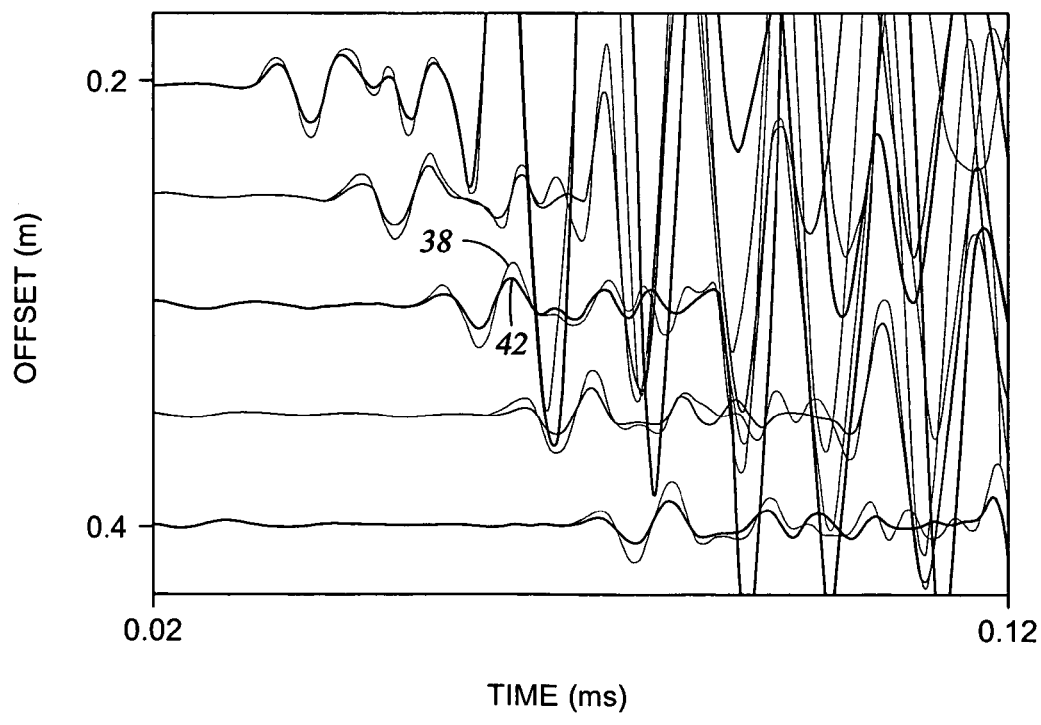
Figure 5A:
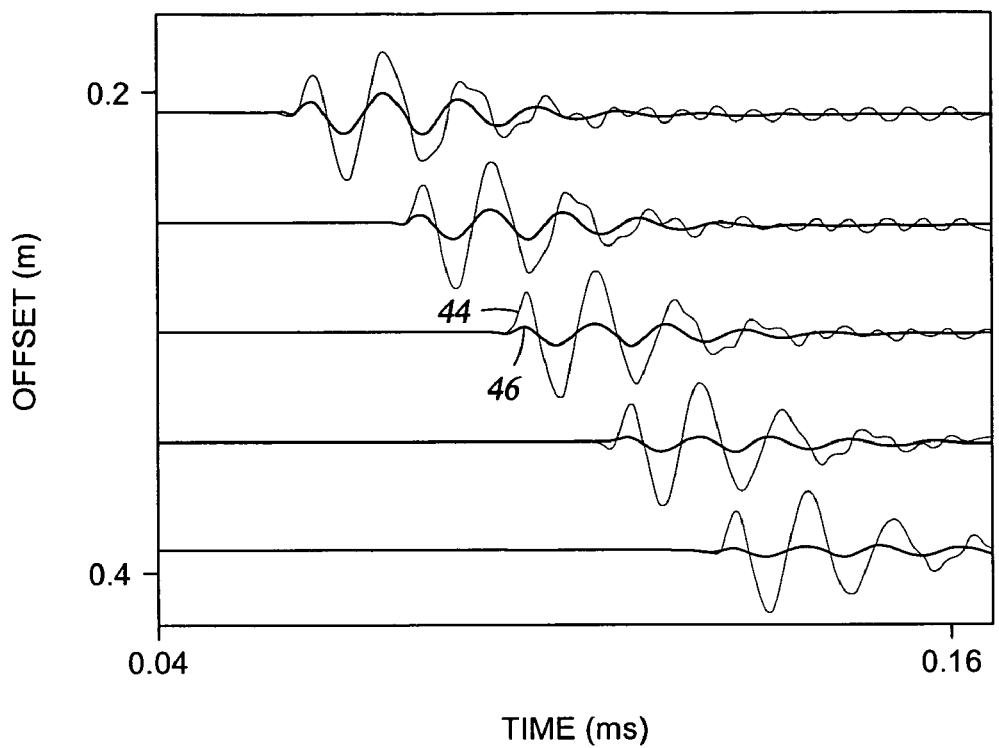
FIGS. 5a and 5b contain wave modeled attenuation results for a transversely polarized shear wave.
Figure 5B:
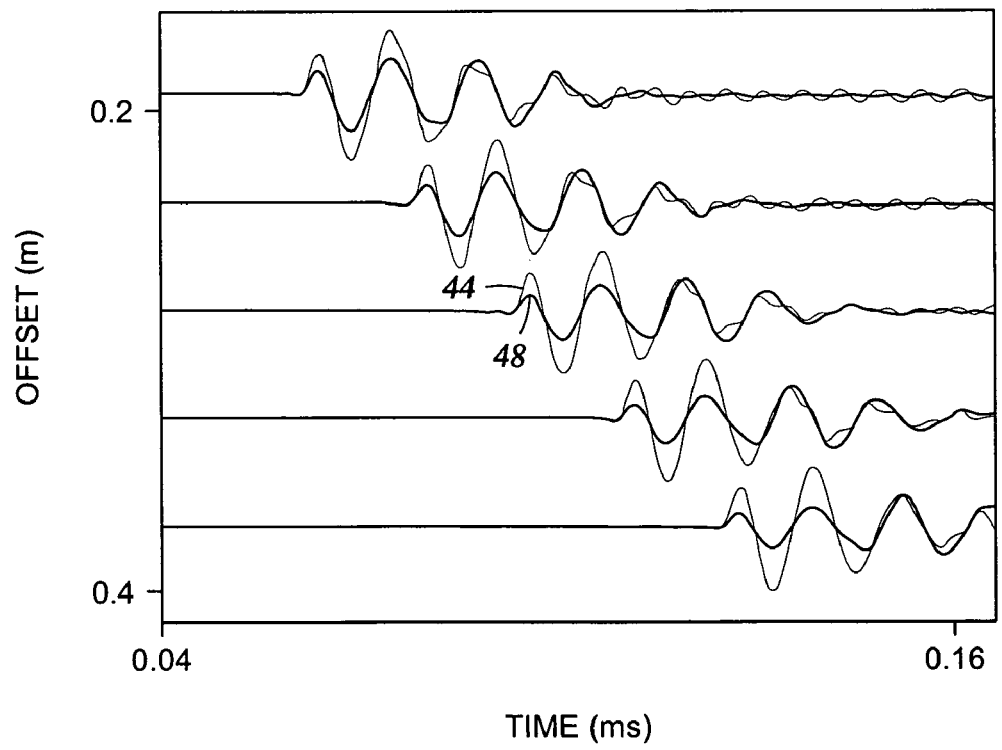

The results of the synthetic wave modeling for the P-SV and transversely polarized shear wave are shown in FIGS. 4a, 4b, 5a, and 5b. FIGS. 4a and 4b illustrate the calculated response of a P-SV wave for free pipe, regular cement, and light weight cement. Likewise, FIGS. 5a and 5b illustrate the calculated response of a transversely polarized shear wave for free pipe, regular cement, and light weight cement. As discussed earlier, free pipe modeling assumes a casing surrounded by fluid that does not have a cement bond adhering the casing to the wellbore formation. More specifically, FIGS. 4a, 4b, 5a, and 5b each contain graphs representing the modeled acoustic wave at the surface of the casing at points along the casing with respect to time. As can be seen from these figures, the ordinate denotes the distance from the acoustic source as an offset in meters, whereas the abscissa forms a time line in milliseconds indicating the length of time that has transpired since the initiation of the wave. The amplitude of the waves of these figures is a normalized value that represents the relative magnitude of particle displacement in the material.

In FIGS. 4a and 4b the wave shown as a dashed line represents the response of a P-SV acoustic wave passing through a casing with no cement, otherwise known as free pipe. For the purposes of illustration herein this line is referred to as the P-SV free pipe wave 38. In FIG. 4a the solid line represents the response of a P-SV acoustic wave passing through casing bounded by regular cement, thus this line is referred to the P-SV regular cement wave 40. Likewise, since the solid line of FIG. 4b represents the response of an acoustic wave traveling through casing bonded with light weight cement, this line is referred to as the P-SV light weight cement wave 42. Similarly, since FIGS. 5a and 5b include the response of a transversely polarized shear wave in casing with no bond (free pipe), bonded with regular cement, and bonded with light weight cement, the waves of these figures are denoted as the TPSW free pipe line 44, the TPSW regular cement line 46, and the TPSW light weight cement line.

A comparison of FIGS. 4a and 5a indicates that the attenuation between the TPSW free pipe line 44 and the TPSW regular cement line 46 is greater and more discernable than the attenuation between the P-SV free pipe line 38 and the P-SV regular cement line 40. Since an acoustic wave modeled as free pipe can represent poorly bonded casing, implementing transversely polarized shear waves can produce an acoustic bond log having more accurate and discernable results over that of an acoustic bond log utilizing P-SV acoustic waves.

Also significant are the results illustrated in FIGS. 4b and 5b containing wave forms representing a comparison of the response of P-SV and TPSW acoustic waves within free pipe and casing bonded with light weight cement. As seen in FIGS. 4b and 5b, the attenuation difference between the response of P-SV and TPSW acoustic waves in free pipe and casing bonded with light weight cement is more pronounced than the attenuation difference between the free pipe and regular cement attenuation curves for P-SV and TPSW acoustic waves. Thus the improved function of bond logs using transversely polarized shear waves over compression/shear waves is even more evident when used in casing bonded with light weight cement than regular cement.

As discussed previously, as an acoustic wave propagates along a casing it will lose energy into the formation through the cement bond. This energy loss can be observed through attenuation of the wave during propagation along the surface of the casing. In comparison to a compression/shear wave, the attenuation of a transversely polarized shear wave within a light weight cement is more distinguishable from its attenuation within a fluid.

EXAMPLE 2

Additional modeling of a transversely polarized shear wave was performed where the acoustic wave was modeled as a point source, thereby providing a 3-dimensional aspect to the modeling results. This was accomplished by representing the transmitter as a localized point source that allows for 3-dimensional spreading loss of the wave energy. As in Example 1 the frequency of the wave in the 3-dimensional modeling was held at 80 kHz and the transmitter positioned at the origin (x=y=z=0). The 3-dimensional test also maintained the same modeling parameters as the test of Example 1, except that the casing was set to 0.7 cm instead of 1.0 cm.

Figure 6:
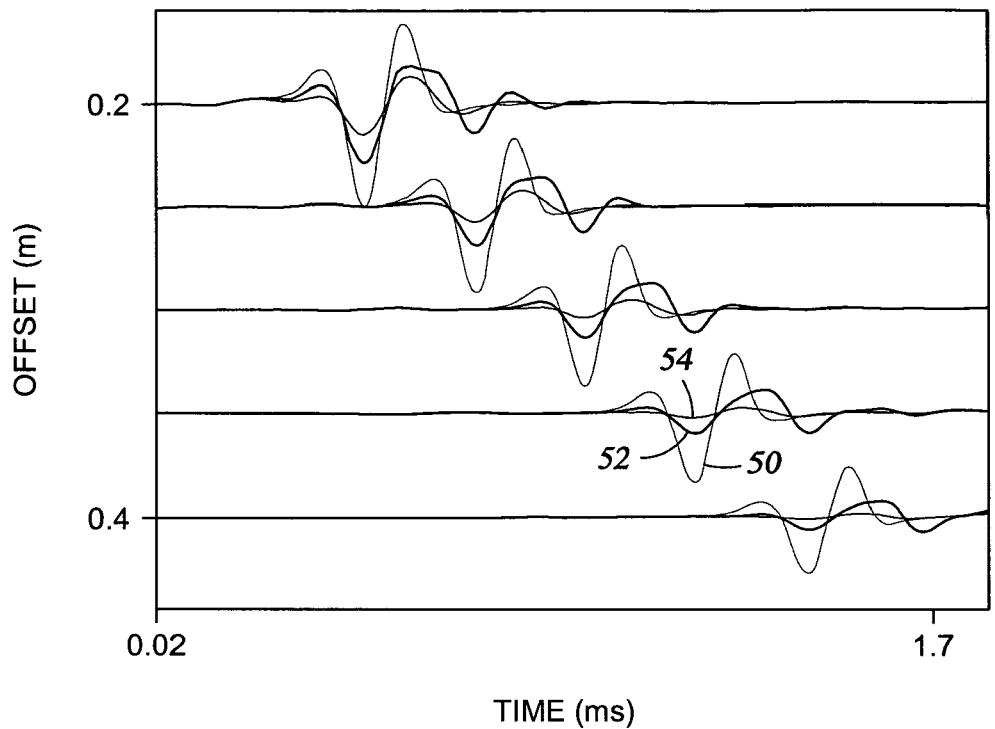
FIG. 6 contains wave modeled attenuation results for a transversely polarized shear wave.
Figure 9:
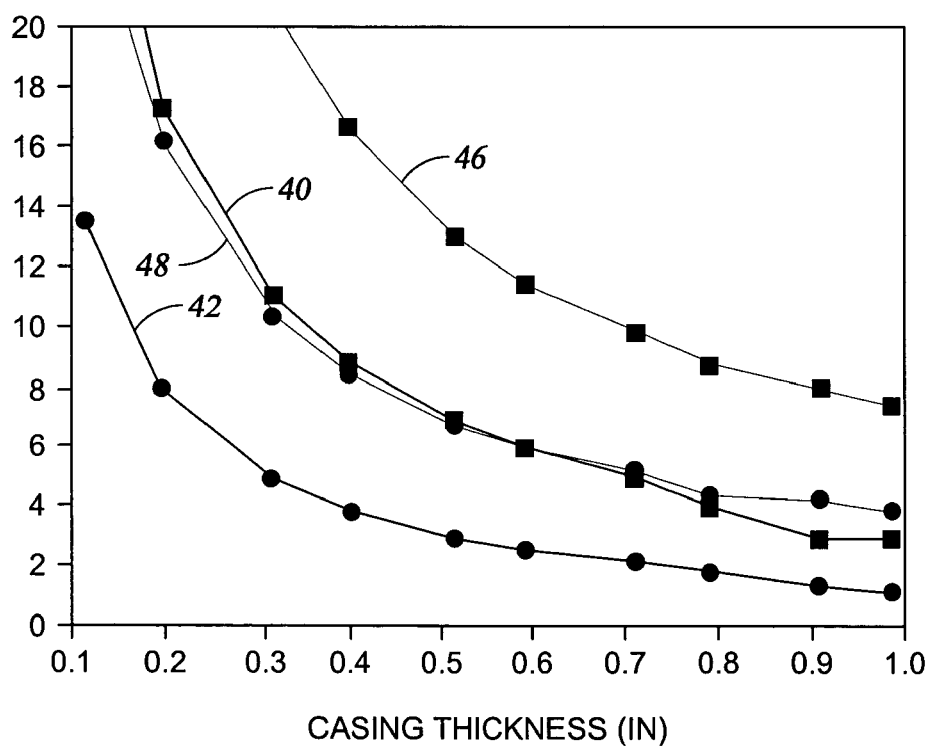
FIG. 9 illustrates the modeled attenuation of compressional components for regular and light weight cements

FIGS. 6 and 9 contain results from 3-dimensional modeling. The 3-dimensional modeling results are shown in FIG. 6 comprise wave forms representing the attenuation of a transversely polarized shear wave in free pipe (TPSW free pipe wave (3D) 50), casing bonded in regular cement (TPSW regular cement wave (3D) 54), and casing bonded in light weight cement (TPSW light weight cement wave (3D) 52). From these waveforms it can clearly be seen that the relative difference in attenuation is maintained between the free pipe wave responses and light weight and regular cement wave responses. This demonstrates that the 2-dimensional modeling correctly predicts the attenuation caused by casing-cement coupling.

FIG. 9 illustrates the modeled attenuation of P (compressional) components for regular and lightweight (LWC) cements (40 and 42) and SH (shear) components for regular and lightweight (LWC) cements (46 and 48) obtained from 3D finite difference simulation. The results are calculated for the source frequency of 80 kHz and presented versus casing thickness. The attenuation displayed in this figure is shown relative to free pipe (i.e. attenuation obtained from the free pipe simulation is subtracted from the attenuation obtained from the simulation with cement). The attenuation therefore indicates the ability of the wave component (P or SH) to differentiate between the cemented and non-cemented (free pipe) cases. As shown, the SH component has an advantage over P component, because it exhibits higher attenuation for the same cement type (regular or LWC). The figure also shows that SH component exhibits the same level of attenuation with LWC as P component does with regular cement. Since current acoustic tools using the P component can successfully detect the attenuation difference between the regular cement and free pipe (i.e. they are able to detect the difference in the magnitude of attenuation shown in the figure for regular cement—upper solid curve), the tool using SH component should be able to detect the difference between the LWC and free pipe.

EXAMPLE 3

Physical testing of compression/shear waves and transversely polarized shear waves was conducted on a test stand comprising a semi-cylindrical section of casing. The physical testing included transmitting both compression/shear waves (P-SV) and transversely polarized shear (TPSW) waves to the section of casing and recording the attenuation of those waves. Tests were performed for the section of casing with no bonding (free pipe), bonded with regular cement, and bonded with light weight cement. The inner diameter of the casing was 13.3 cm with a 1 cm thickness. Two different transmitter receiver configurations were used, in the first configuration a single transmitter was included with two receivers, where the two receivers were arranged along the same axis of the transmitter 8 cm apart. In the second configuration a single transmitter was coupled with two receivers, where the two receivers were disposed 30° apart along azimuthally around the pipe circumference and 8 cm apart in the axial direction. Results of these test stand tests are located in Table 2.

TABLE 2

| Wave Components and Physical Models | Attenuation Relative to Free Pipe (dB/ft) |
|---|---|
| SH Component, light weight cement | 9.08 |
| SH Component, regular cement | 16.44 |
| P Component, light weight cement | 3.42 |
| P Component, regular cement | 8.00 |

A review of the data of Table 2 indicate that actual physical testing on a test stand further illustrates the improved cement bond log results realized utilizing transversely polarized shear waves over compression/shear waves. The attenuation magnitudes of Table 2 illustrate the higher resolution and ease of data analysis afforded by implementing TPSW waves over P-SV waves.

The software modeling results indicate that the relationship between the wavelength of the acoustic wave and the thickness of the casing can have an effect on measured attenuation. For example, it has been found that when the acoustic wavelength is 4 times or more than the casing thickness, the acoustic attenuation can vary significantly. Better and more consistent attenuation resolution is obtained for smaller casing thickness to wavelength ratios. When this ratio is above 0.25 (i.e. the acoustic wavelength is less than about 4 times the casing thickness) the attenuation measurement based on the analysis of first arrival can be complicated due to wave interference phenomena and may give inconsistent results. While good results can be obtained with the wavelength much greater than about 4 times the casing thickness, it is preferred that the wavelength not be greater than about 10 times the casing thickness.

Figure 7A:
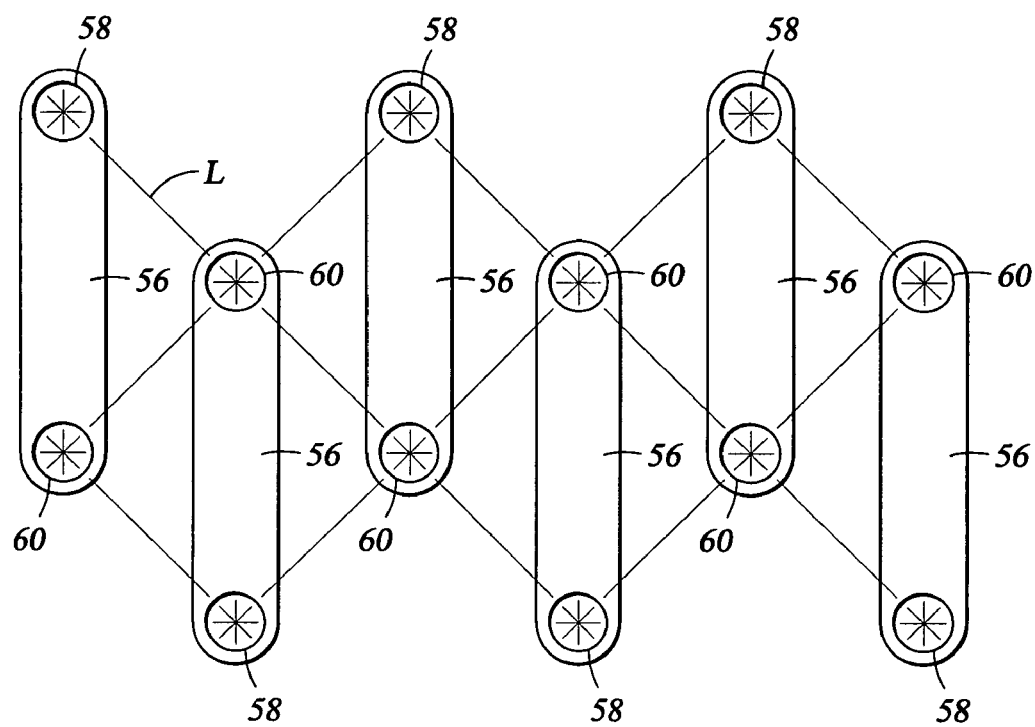
FIG. 7a depicts a pad and transmitter/receiver transducer arrangement.
Figure 7B:
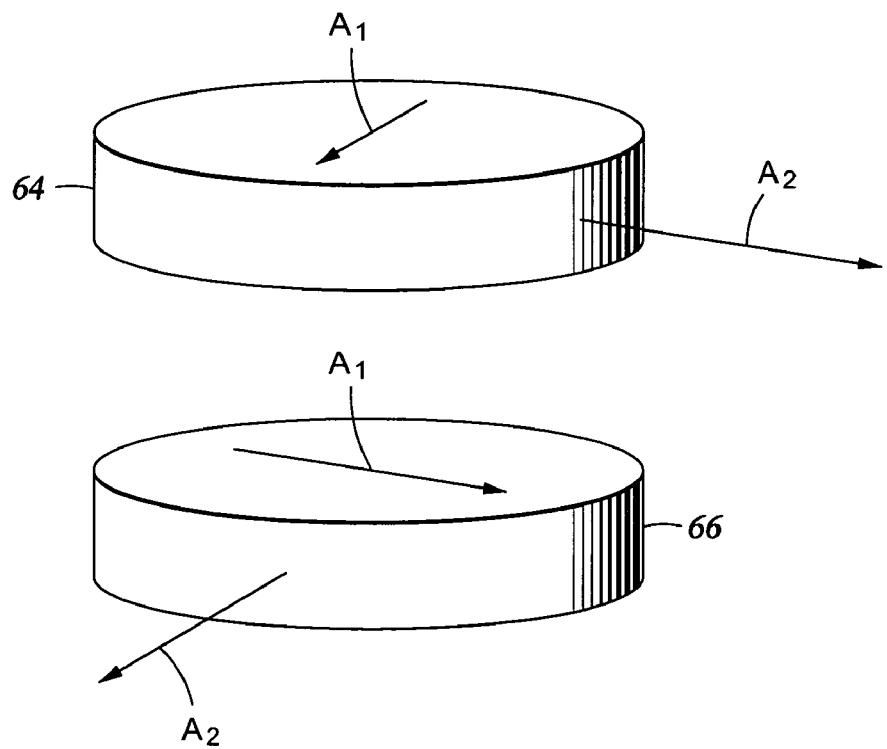
FIG. 7b illustrates a stacked disk transducer configuration.
Figure 8:
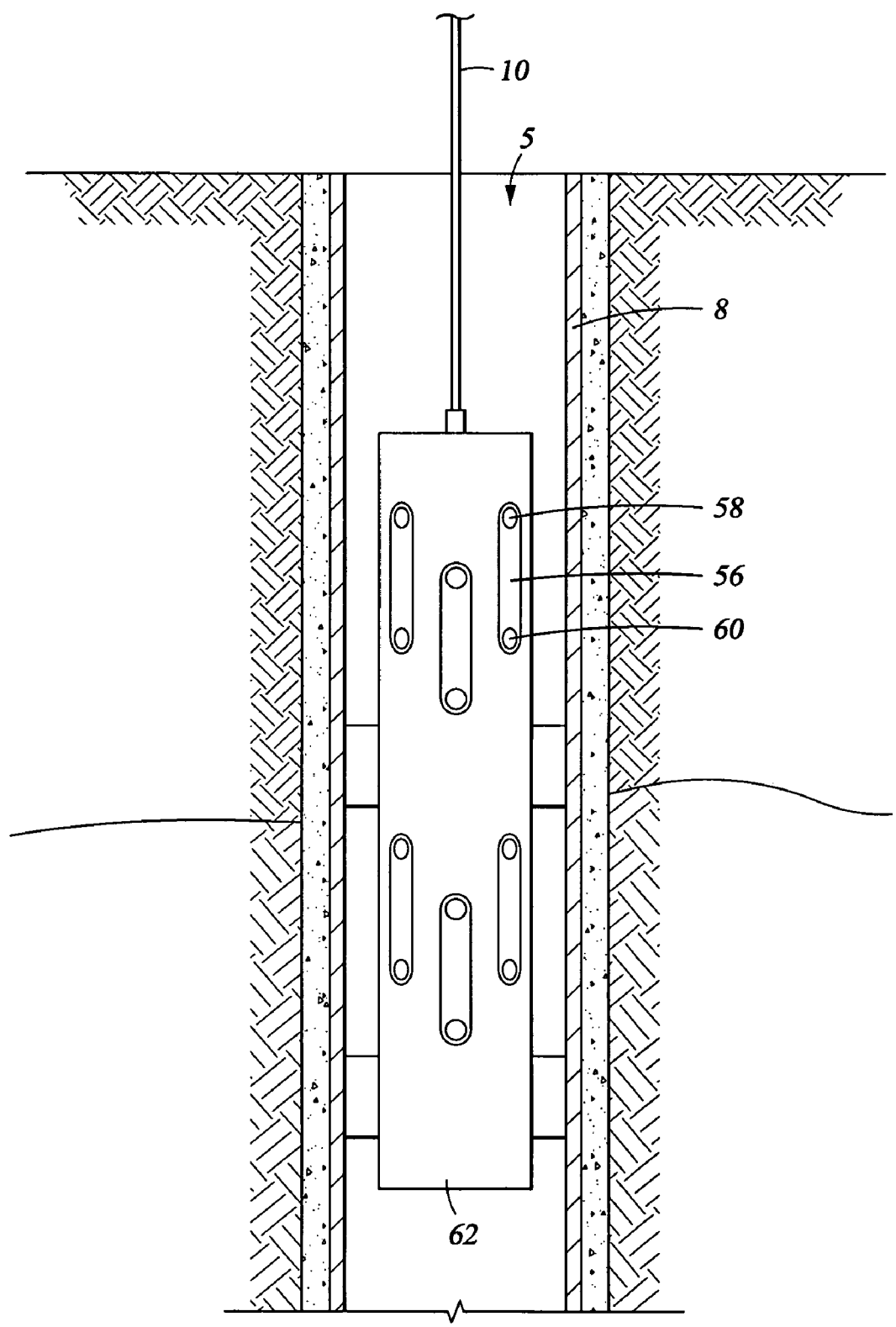
FIG. 8 shows one embodiment of the present invention disposed within a wellbore.

Optimal measurements of a transversely polarized shear wave should be conducted perpendicular to the source polarization of the wave. As can be seen in FIG. 7a, such pads 56 often include a series of transmitting transducers 58 formed onto pads 56 coupled with a series of receiving transducers 60 where the pads 56 are arranged in an oblique fashion. Such an arrangement is generally adequate when the wave form is a P-SV wave where the emitted wave can be measured in any direction since the wave radiation is omni-directional. Lines L provided onto FIG. 7a, help to illustrate the omni-directional relationship between transmitting transducers 58 and corresponding receiving transducers 60. Due to the requirements of transversely polarized shear waves, preferably the transmitting transducers 58 and receiving transducers 60 include at least two shear wave generating disks. These disks are shown in FIG. 7b as an upper disk 64 and a lower disk 66. Included in FIG. 7a with the disks are arrows A1 and A2 that respectively represent the direction of polarization and propagation of the produced transversely polarized shear wave. Thus arrow A1, and thus the polarization, of the upper disk 64 is directed at substantially 90° to the direction of arrow A1 and polarization of the lower disk 66. Likewise, arrow A2, the propagation, of the upper disk 64 is directed at substantially 90° to the direction of A2 and propagation of the lower disk 66. Preferably both the upper disk 64 and the lower disk 66 are comprised of a piezo-electric device capable of producing the transversely polarized shear wave. Optionally, a third disk can be added to the stack capable of generating a compression/shear (P-SV) wave in the event it is desired to make conventional P-SV measurements.

The pads 56 can be of any type now known or later developed, but should provide a support base on which the transmitting and receiving transducers (58 and 60) can be secured. The pads 56 should also provide a radial push onto the transmitting and receiving transducers (58 and 60) to urge them against the inner surface of the casing 8 with sufficient force to ensure shear coupling between the transmitting and receiving transducers (58 and 60) and the casing 8. With regard to transversely polarized shear waves, it is important that shear coupling exist between the casing 8 and the transducers (58 and 60) otherwise these waves may not be effectively transmitted between the downhole tool 62 and the casing 8.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A method of evaluating a casing bond disposed between a casing and a wellbore comprising:
    inducing a transversely polarized shear wave into the casing that propagates along an X axis that is substantially parallel to the casing surface and polarized to cause particle movement in the casing along a Z axis that is orthogonal to the X axis and the Z axis is substantially parallel to the casing surface;
    monitoring the attenuation of said transversely polarized shear wave; and
    estimating a characteristic of the casing bond based on said monitoring.

2. The method of claim 1 wherein the frequency of said transversely polarized shear wave ranges from about 60kHz to about 120kHz.

3. The method of claim 1, wherein the frequency of said transversely polarized shear wave is about 80kHz.

4. The method of claim 1, wherein the wavelength of said transversely polarized shear wave ranges from at least 4 times the thickness of the casing to at least 10 times the thickness of the casing.

5. The method of claim 1 further comprising positioning a transmitting transducer and a receiving transducer within said casing, wherein said receiving transducer ranges from about 15 cm to about 60 cm from said transmitting transducer.

6. The method of claim 1 wherein said step of estimating a characteristic of the casing bond is selected from the group consisting of estimating the quality of the casing bond, estimating the integrity of cement forming the casing bond, identifying the presence of microannuluses within the casing bond, and estimating the thickness of the casing bond.

7. The method of claim 6 wherein the type of casing bond evaluated is selected from the group consisting of regular cement, light weight cement, and free pipe.

8. The method of claim 1 further comprising positioning a transducer within the casing, wherein the transducer is coupled to the casing.

9. The method of claim 8, wherein the coupling is accomplished by urging the transducer into mechanical contact with the casing.

10. A method of evaluating a casing bond disposed between a casing and a wellbore comprising:
    inserting a tool within the casing, that is capable of creating a transversely polarized shear wave;
    creating a transversely polarized shear wave with said downhole tool that propagates along an X axis in the casing that is substantially parallel to the casing surface and polarized to cause particle movement in the casing along a Z axis that is orthogonal to the X axis and the Z axis is substantially parallel to the casing surface
    monitoring the attenuation of said transversely polarized shear wave passing through the casing bond; and
    estimating the quality of the casing bond disposed between the casing and the wellbore based on an evaluation of the attenuation of said transversely polarized shear wave.

11. The method of claim 10 wherein said tool comprises at least one transmitting transducer capable of creating said transversely polarized shear wave and at least one receiving transducer capable of receiving said transversely polarized shear wave.

12. The method of claim 11, wherein said at least one transducer capable of creating said transversely polarized shear wave comprises at least two disks.

13. The method of claim 12, further comprising orienting said at least two disks such that the propagation of waves produced by each of said at least two disks are emitted substantially perpendicular to one another.

14. The method of claim 11, wherein said receiving transducer is disposed from about 15 cm to about 60 cm from said transmitting transducer.

15. The method of claim 10 wherein the frequency of said transversely polarized shear wave ranges from about 60kHz to about 120kHz.

16. The method of claim 10, wherein the frequency of said transversely polarized shear wave is about 80kHz.

17. The method of claim 10, wherein the wavelength of said transversely polarized shear wave ranges from at least 4 times the thickness of the casing to at least 10 times the thickness of the casing.

18. The method of claim 10 wherein said step of estimating the quality of the casing bond is selected from the group consisting of estimating the quality of the casing bond, estimating the integrity of cement forming the casing bond, identifying the presence of microannuluses within the casing bond, and estimating the thickness of the casing bond.

19. The method of claim 18 wherein the type of casing bond evaluated is selected from the group consisting of regular cement, light weight cement, and free pipe.

* * * * *